Sept. 19, 1967    W. J. BOARD, JR., ET AL    3,342,862
METHOD FOR PRODUCING DIMETHYLACETAMIDE
Filed Aug. 14, 1964
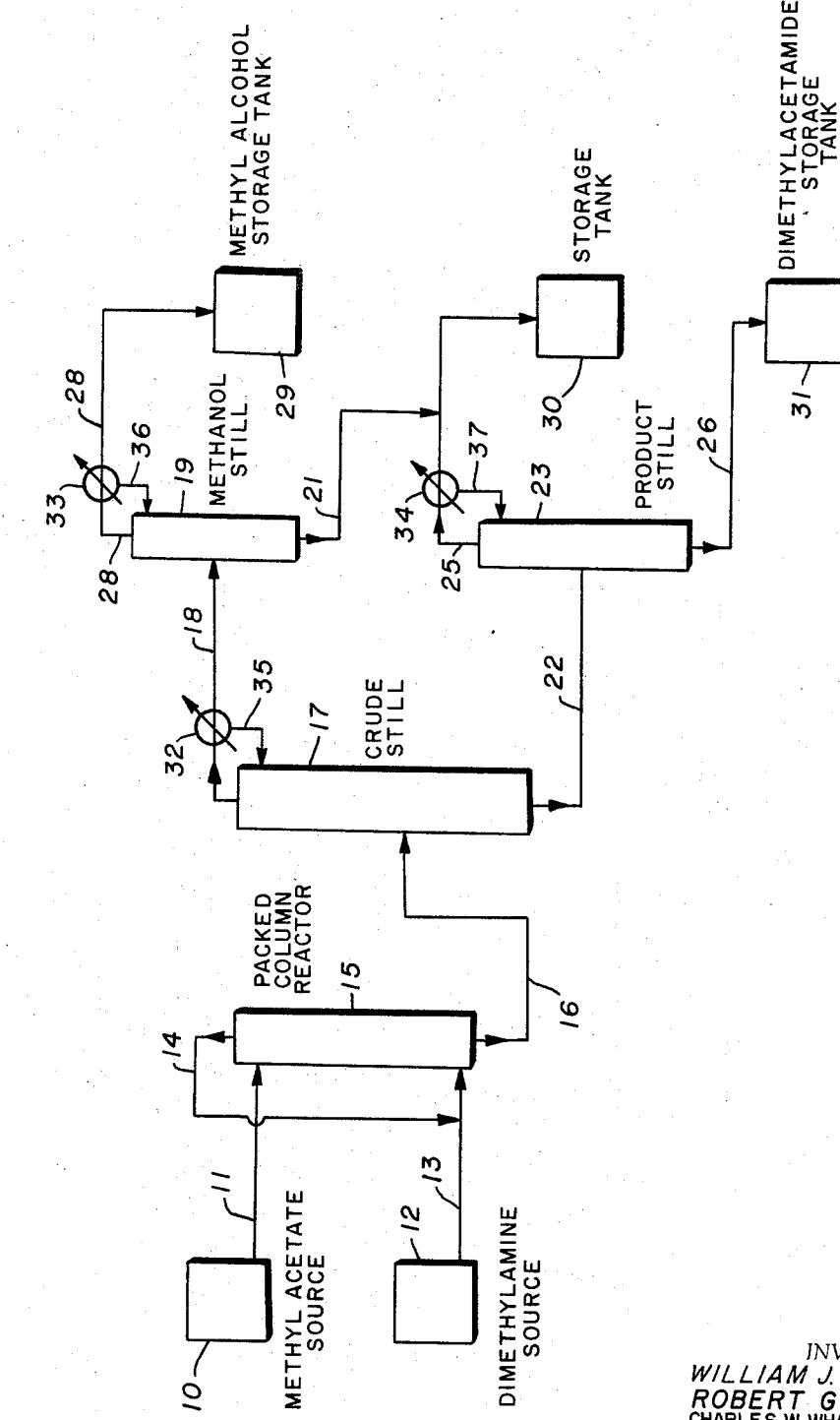
INVENTORS
WILLIAM J. BOARD, JR.
ROBERT G. WOOTEN
CHARLES W. WHATLEY
Robert L. Brood
ATTORNEY 3,342,862
METHOD FOR PRODUCING DIMETHYLACETAMIDE
William J. Board, Jr., Robert G. Wooten, and Charles W. Whatley, Decatur, Ala., assignors to Monsanto Company, St. Louis, Mo., a corporation of Delaware
Filed Aug. 14, 1964, Ser. No. 389,658
6 Claims. (Cl. 260—561)

This invention relates to a process for the manufacture of alkyl substituted acylamides; and more specifically, this invention relates to the manufacture of dimethylacylamides from dimethylamine and an alkyl ester.

The prior art teaches the preparation of dimethylacylamides by reacting a carboxylic acid with dimethylamine. This reaction has the disadvantage of forming a mixture which is an acid-amide azeotrope. This mixture boils uniformly at temperatures from 4° to 5° C. above the boiling points of the pure acylamides, and as a result of the azeotrope, it is difficult to remove the acylamide therefrom.

United States Patent 2,667,511 to Downing teaches a method for producing alkyl substituted acylamides without the formation of azeotropes by reacting acetic acid or acetic anhydride with dimethylamine. This reaction was carried out in a liquid body of dimethylacetamide and acetic acid in which the body content of the acetic acid was less than the azeotrope thereof. Although this process is useful to obtain dimethylacetamide in relatively pure form, it is limited to the use of carboxylic acids or corresponding anhydrides as starting materials.

An object of this invention is to provide a new method for producing alkyl-substituted acylamides.

Another object of this invention is to provide a method for producing dimethylacylamide, and more particularly, dimethylacetamide of high purity by an economical process.

A further object of this invention is to provide a method for the preparation of dimethylacetamide from dimethylamine and methyl acetate.

More specific objects and advantages will be apparent to those skilled in the art from the following detailed description which illustrates and discloses but is not intended to limit the scope of the invention.

This invention may be accomplished by contacting in a packed column reactor an excess of a gaseous dimethylamine with an aqueous solution of an ester of the formula:

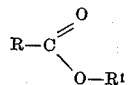

where R is H, $CH_3$, $C_2H_5$ or $C_3H_7$ and $R^1$ is $CH_3$, $C_2H_5$ or $C_3H_7$. The general reaction between the dimethylamine and the alkyl ester for producing the dimethylacylamide may be written as follows:

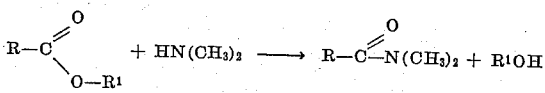

Dimethylacetamide and methyl alcohol may be produced from dimethylamine and methyl acetate according to the following reaction:

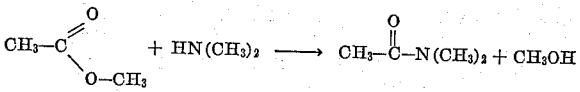

wherein one mole of methyl acetate is reacted with one mole of dimethylamine which produced one mole of dimethylacetamide together with one mole of methyl alcohol.

It can be seen that the by-product, methyl alcohol, may be commercially sold. In the patent to Downing, water was formed as the by-product which, of course, has little or no commercial value.

Although the stoichiometric proportions of the reactants are one to one as indicated by the above equation, it is advantageous to use an excess of the dimethylamine in order to effect complete conversion of all of the methyl acetate. The excess unreacted dimethylamine is easily recovered and recycled back to the reactor. Theoretically, the conversion from methyl acetate to dimethylacetamide should be 100 percent and as the examples will show, the results herein obtained approach that ideal.

The presence of water or other hydroxyl rich diluents in the system is necessary to obtain a complete reaction of the methyl acetate with the dimethylamine. However, the presence of water also causes some hydrolysis of the methyl acetate thereby forming acetic acid and methanol according to the following equation:

Since the operating conditions, which are atmospheric pressure and 30° C., of the present invention are not conducive to the further reaction of acetic acid with dimethylamine as described in the patent to Downing, any acid which is formed remains as such within the system and is an impurity. It was found, however, that the concentration of water could be optimized to convert the methyl acetate predominately to the amide with only trace amounts of acetic acid being formed by hydrolysis. This optimum level of water was found to be from 8 to 45 percent by weight of the methyl acetate feed, and preferably, from 15 to 25 percent.

It was also found that methyl alcohol or aqueous solutions thereof could also be used as the diluent for methyl acetate with no adverse affect on the reaction. This, of course, eliminates the problem of having to remove the acetic acid since none is formed. Other aqueous solutions, e.g. solutions of an alcohol corresponding to the alcohol moiety of the added ester (i.e. an alcohol containing up to about 3 carbon atoms), dioxane and ethylene glycol, were also found to be satisfactory. However, the rise of the latter mentioned diluents unnecessarily complicates the product recovery system; therefore, their use is generally not warranted.

The process of the invention will be apparent from the following description when read in connection with the drawing, the single figure of which illustrates diagrammatically an assembly of apparatus suitable for carrying out the process. In the following description, the process is described as applied to the preparation of N-N dimethylacetamide from methyl acetate and methylamine. However, it is apparent that the same process may be carried out for any of the other dimethylacylamides herein disclosed.

In the drawing, the aqueous solution of methyl acetate is metered from tank 10, through line 11, and into the upper section of packed column reactor 15. Reactor 15 contains dimethylacetamide, water and methyl alcohol as well as the added methyl acetate. The gaseous dimethylamine is metered from tank 12 through line 13 and into the lower section of packed column reactor 15 where it bubbles up through the length of the reactor 15. The gaseous dimethylamine which has not entered into the reaction with the methyl acetate is removed from the reactor 15 and is recycled to the lower section of reactor 15 through line 14 which connects with line 13. The liquid reaction products comprising dimethylacetamide, methanol, water and traces of acetic acid flow from the bottom of reactor 15, through line 16 and into crude still 17 which is provided with a steam heated reboiler (not shown). The low boiling methanol is distilled and the gas produced thereby along with some water vapor is taken off overhead from still 17, through line 18 where a part thereof is condensed in condenser 32 and is returned to still 17 through pipe 35 as reflux while the remainder is fed to the methanol still 19. In still 19, the methanol is vaporized and taken overhead by line 28 to a condenser 33 whereupon a portion of the methanol liquid is recycled to the still 19 as reflux through line 36 and the remainder is collected in a tank 29. The methanol in tank 29 is ready for immediate use by industry and, therefore, is a useful and valuable by-product. The recovered water in methanol still 19 flows from the bottom of still 19 through line 21 into line 25 and collected in storage tank 30.

The higher boiling bottoms which include the dimethylacetamide, the remainder of the water and traces of acetic acid are drained from crude still 17 through line 22 into product still 23. The water is flashed off and passes through line 25 into condenser 34 whereupon a portion thereof is recycled to product still 23 as reflux through line 37 and the remainder thereof is collected in storage tank 30. The relatively pure dimethylacetamide passes through line 26 and into storage tank 31. The traces of acetic acid remain with the dimethylacetamide; however, the quantity is so minute that the quality of the dimethylacetamide is not affected.

The following examples are cited to illustrate the invention and not intended to limit it in any way. Unless otherwise noted, all percentages, as expressed in the examples indicate percent by weight.

*Example I*

An aqueous solution comprising 86 percent methyl acetate and 14 percent water was fed through pipe 11 from tank 10 to the upper section of the packed reactor column 15. A supply of gaseous dimethylamine was fed through pipe 13 from tank 12 to the lower section of reactor 15. The excess unreacted dimethylamine exiting column 15 was returned through line 14 to the dimethylamine feed line 13 so that the total dimethylamine feed was in excess of the stoichiometric requirement, although the amount fed from tank 12 was essentially equal to the methyl acetate feed on molar basis.

The reactor column 15 was operated at atmospheric pressure and at 30° C. which was slightly above ambient temperature due to the exothermic nature of the reaction. The reaction products comprising dimethylacetamide, methyl alcohol, water, and traces of acetic acid were fed from the bottom of reactor 15 through line 16 into the crude still 17. In still 17, the methanol and some water was fractionated from the higher boiling component by heating to a vapor temperature of about 75° C. The methanol-water vapor was conducted from still 17 through line 18 to condenser 32 and into methanol still 19, with a part of the vapors being condensed and returned to still 17 through line 35 as reflux.

The methanol was separated from the water in the still 19 and taken overhead as a vapor in line 28. A part of the methanol condensate was returned to still 19 after being condensed in condenser 33 through line 36 as reflux, while the remainder was collected in tank 29 as a saleable by-product. The water removed from the methanol was transferred via lines 21 and 25 to tank 30.

The higher boiling fraction from still 17 comprising dimethylacetamide, water and traces of acetic acid were fed through line 22 to the product still 23, where the water was removed overhead and the dimethylacetamide product containing traces of acetic acid was collected as bottoms via line 26 in tank 31. A portion of the water vapor was condensed in a condenser 34 and was recycled to still 23 through line 37. The water removed overhead via line 25 was condensed in a heat exchanger and then collected in tank 30, except for a portion which was returned to still 23 as reflux.

The conversion methyl acetate to dimethylacetamide was in excess of 98 percent. The dimethylacetamide produced in this manner is of good quality and suitable for use as a solvent for spinning acrylic fibers. The water collected in tank 30 may be sewered or used to dilute the methyl acetate feed to the process. The methanol collected in tank 29 may be sold as a by-product or also used to dilute the methyl acetate feed to the process.

*Example II*

The process of Example I was repeated using as feed an aqueous solution comprising 58 percent methyl acetate, 14 percent methanol, and 28 percent water at 30° C. Conversion of the methyl acetate to dimethylacetamide was in excess of 98 percent.

*Example III*

The process of Example I was repeated using as feed an aqueous solution comprising 24 percent methyl acetate, 6 percent methanol, 25 percent dioxane, and 45 percent water. Approximately 85 percent of the methyl acetate was converted to a dimethylacetamide product which contained no detectable amounts of acetic acid. The unreacted methyl acetate and the dioxane diluent were recovered with the methanol and water fraction from crude still 17.

*Example IV*

The process of Example I was repeated using as feed an aqueous solution comprising 24 percent methyl acetate, 6 percent methanol, and 70 percent water at 30° C. Approximately 61 percent of the methyl acetate was converted to dimethylacetamide and 39 percent converted to acetic acid.

*Example V*

The process of Example IV was repeated with the temperature of the feed reduced to −6° C. The conversion of methyl acetate to dimethylacetamide was approximately 80 percent and no detectable amounts of acetic acid were formed.

*Example VI*

The process of Example I was repeated using 60 percent methyl acetate, 20 percent dimethylamine and 20 percent of methanol which acted as the solvent. The conversion of methyl acetate to dimethylacetamide was approximately 90 percent.

It is apparent from the foregoing examples that many modifications of the present invention may be employed without departing from the scope thereof. For example, the use of diluents other than water, such as dioxane or methyl alcohol, apparently have no adverse affect on the conversion of the methyl acetate or on the purity of the dimethylacetamide product. However, the use of diluents other than water or the alcohol corresponding to the acetate is not generally recommended because it complicates the recovery system and adversely affects the economics of the process.

A low feed temperature is desirable where the feed stock contains a high percentage of water; however, it is most economical to operate at ambient temperature with the lower concentrations of water in the feed, this being two of the main advantages of this process. It is also permissible to substitute a bubble cap or other reactor device for the packed column reactor described herein.

Many modifications of this invention may be made without departing from the scope and spirit thereof. It is contemplated that variations may be made in the percentages of the compounds used without greatly altering the effectiveness of the process; therefore, the applicant does not wish to be bound by the numbers except as they appear in the claims.

We claim:

1. A process of manufacturing dimethylacylamide of the formula:

$$RCON(CH_3)_2$$

where R is an alkyl radical containing from 1 to 3 carbon atoms, the process comprising contacting at about atmospheric pressure and at a temperature within the range of from about −6° C. up to about 30° C., a stoichiometric excess of dimethylamine and an ester solution consisting essentially of an acyl ester of the formula $$R'-\underset{\underset{O}{\|}}{C}-O-R''$$

where R' is H, CH$_3$, C$_2$H$_5$ or C$_3$H$_7$ and R'' is CH$_3$, C$_2$H$_5$ or C$_3$H$_7$ and from about 8% up to about 75% by weight of an hydroxy compound selected from the group consisting of water, an alcohol containing from 1 to 3 carbon atoms, and a combination of the water and the alcohol, wherein temperatures at the lower end of the temperature range are employed when higher percentages of the hydroxy compound in the ester solution are present.

2. The process of claim 1 wherein the acyl ester is methylacetate.

3. The process of claim 1 wherein the ester solution contains from about 8 to about 45% by weight of the hydroxy compound.

4. A process of manufacturing dimethylacetamide comprising contacting at about atmospheric pressure and at a temperature within the range of from about −6° C. up to about 30° C., a soichiometric excess of dimethylamine and an ester solution consisting essentially of methylacetate and from about 8 to about 45% by weight of an hydroxy compound selected from the group consisting of water, methanol and a combination of water and methanol.

5. The process of claim 4 wherein the ester solution contains from about 15 to about 25% by weight of the hydroxy compound.

6. A process of manufacturing dimethylacetamide comprising (1) contacting at about atmospheric pressure and at a temperature within the range of from about −6° C. up to about 30° C. a stoichiometric excess of dimethylamine and an ester solution consisting essentially of methylacetate and from about 8 to about 45% by weight of an hydroxy compound selected from the group consisting of water, methanol and a combination of water and methanol, recycling unreacted dimethylamine into the ester solution;

(2) passing the reaction product, composed principally of methanol, water and dimethylacetamide, to a crude still wherein the methanol and part of the water are vaporized, condensed, and part of the condensate is returned to the crude still as reflux;

(3) passing the residue of the condensate to a methanol still wherein the methanol is separated from the water; and (4) passing the bottoms from the crude still to a product still wherein the dimethylacetamide is separated as a product.

References Cited
UNITED STATES PATENTS 2,667,511  1/1954  Downing _____ 260—561
3,072,725  1/1963  Surman _____ 260—561

ALEX MAZEL, Primary Examiner.

J. NARCAVAGE, Assistant Examiner.